UNITED STATES PATENT OFFICE.

ROSA DEAN HANN, OF ORLAND, CALIFORNIA.

PROCESS OF CURING OLIVES.

1,182,270.     Specification of Letters Patent.     Patented May 9, 1916.

No Drawing.     Application filed October 15, 1915. Serial No. 56,015.

*To all whom it may concern:*

Be it known that I, ROSA DEAN HANN, a citizen of the United States, residing at Orland, in the county of Glenn and State of California, have invented a new and useful Improvement in the Process of Curing Olives.

This invention relates to the process of removing the bitter flavor from the olive before dehydrating.

It has for its object to render the dehydrated olive more valuable as a nerve and eye food, and has for a feature the omission of sodium chlorid.

Hitherto the bitter flavor which makes the fresh ripe olive absolutely inedible has been removed either by a slow treatment with water and common salt (sodium chlorid) or by a more rapid treatment with a solution containing the carbonate of an alkaline element (e. g. potassium, sodium, etc.) and also, either simultaneously or later, a solution of common salt (sodium chlorid). In both cases the use of sodium chlorid has been regarded as necessary in order to prevent the softening of the flesh of the olive and to enable it to withstand the necessary handling without falling to pieces before its bitterness shall have disappeared sufficiently to render it fit for drying as a food.

My improvement is rendered practicable by heating to a temperature of about 175° F., the first solution in which the fresh ripe olives are placed, whether the same be a water or an alkaline solution, and by leaving the olives in this previously heated solution until it has cooled, or (if it be a water treatment only) not more than 12 hours. Such heating serves to soften the waxy coating of the surface of the olive and enables all subsequent treatments to affect the inner substance of each olive more promptly, more completely and more uniformly than they would if compelled to penetrate primarily and mainly by way of the small opening at the stem end of the olive, thus tending to prevent the fruit from breaking.

To remove the bitter flavor I soak the olives in a solution containing 2 oz. of potassium carbonate (commercial lye) to each gallon of water, for 4 hours, drain, rinse, drain again, and repeat the process until the flesh of the olive no longer appears white when cut through to the pit in the center. Two or three rinsings or short soakings in clean water are necessary to remove any excess of potassium carbonate, before drying.

What I claim is:

1. The process of treating olives which consists in subjecting fresh olives to the action of liquid adapted to attack the waxy constituent near the surface of the fruit and render the skin more pervious to other liquids, and then removing the bitter flavor by suitable treatment.

2. The process of treating olives which consists in subjecting fresh olives successively to the action of a warm liquid adapted to render the outer layer more pervious to other liquids and to the action of water containing potassium carbonate, removing potassium carbonate by soaking the fruit in water, and drying the product.

3. The process of treating olives which consists in immersing them in a liquid at about 175° F., allowing the liquid to cool, immersing the same olives for some hours in water containing a small amount of potassium carbonate, and removing potassium carbonate by immersing in water.

4. The process of treating olives which consists in immersing them in warm liquid free from sodium chlorid, allowing the liquid to cool, soaking the olives for about four hours in water containing about two ounces of potassium carbonate for each gallon of water, removing most of the potassium carbonate by soaking in water, and drying the fruit thus treated.

5. The process of treating olives which consists in removing natural waxy material from the outer portions of the olives by immersing for a suitable time in warm water, removing the bitter flavor by soaking in water containing a small proportion potassium carbonate, soaking in water to remove potassium carbonate, and lastly drying the fruit.

ROSA DEAN HANN.

Witnesses:
E. E. MARTIN,
P. K. HICKS.